US012179694B2

(12) United States Patent
Bang et al.

(10) Patent No.: US 12,179,694 B2
(45) Date of Patent: Dec. 31, 2024

(54) SEATBELT DEVICE OF VEHICLE FOR DETERMINING WHETHER A USER WEARS A SEATBELT CORRECTLY OR ERRONEOUSLY

(71) Applicants: Hyundai Motor Company, Seoul (KR); Kia Corporation, Seoul (KR)

(72) Inventors: Taeyoung Bang, Gyeonggi-do (KR); Youngrok Kim, Gyeonggi-do (KR); Soo Chul Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 50 days.

(21) Appl. No.: 17/984,637

(22) Filed: Nov. 10, 2022

(65) Prior Publication Data

US 2023/0339427 A1     Oct. 26, 2023

(30) Foreign Application Priority Data

Apr. 25, 2022  (KR) .......................... 10-20220050538
Jun. 23, 2022  (KR) .......................... 10-20220076660

(51) Int. Cl.
*B60R 22/48*   (2006.01)
*B60R 22/12*   (2006.01)
*B60R 22/26*   (2006.01)

(52) U.S. Cl.
CPC .............. *B60R 22/48* (2013.01); *B60R 22/12* (2013.01); *B60R 22/26* (2013.01); *B60R 2022/485* (2013.01); *B60R 2022/4866* (2013.01)

(58) Field of Classification Search
CPC ......... B60R 22/48; B60R 22/12; B60R 22/26; B60R 2022/485; B60R 2022/4866
See application file for complete search history.

(56) References Cited

U.S. PATENT DOCUMENTS

| | | | |
|---|---|---|---|
| 2019/0197326 A1* | 6/2019 | Ohno | B60R 22/12 |
| 2020/0298796 A1* | 9/2020 | Cech | B60R 21/01512 |
| 2021/0394710 A1* | 12/2021 | Hu | B60R 22/48 |
| 2022/0398404 A1* | 12/2022 | Chung | G06V 10/44 |

FOREIGN PATENT DOCUMENTS

| | | |
|---|---|---|
| DE | 10 2020 127 221 A1 | 5/2021 |
| JP | 2007-055294 A | 3/2007 |
| JP | 2018-141247 A | 9/2018 |
| JP | 2020006780 A * | 1/2020 |
| KR | 101509087 B1 | 4/2015 |
| KR | 10-2021-0090960 A | 7/2021 |

OTHER PUBLICATIONS

European Search Report dated Sep. 18, 2023 in correspondinng European Patent Application No. 22210062.0.

* cited by examiner

*Primary Examiner* — Adnan Aziz
*Assistant Examiner* — James E Munion
(74) *Attorney, Agent, or Firm* — Fox Rothschild LLP

(57) ABSTRACT

A seat belt apparatus of a vehicle described in the present disclosure includes a seat belt coupled to a seat and including a webbing comprising a detectable material; a vision sensor configured to generate an image by capturing a field of view region including the seat; and a monitoring system configured to detect a length of the webbing e.g., based on the pattern coated with the at least one paint in the image, and determine whether a user wears the seat belt as desired or erroneously wears the seat belt based on the detected length of the webbing.

17 Claims, 12 Drawing Sheets

(a)          (b)

SEATBELT DEVICE OF VEHICLE FOR DETERMINING WHETHER A USER WEARS A SEATBELT CORRECTLY OR ERRONEOUSLY

CROSS-REFERENCE TO RELATED APPLICATION

This application claims under 35 U.S.C. § 119(a) the benefit of Korean Patent Application No. 10-2022-0050538 filed in the Korean Intellectual Property Office on Apr. 25, 2022 and Korean Patent Application No. 10-2022-0076660 filed in the Korean Intellectual Property Office on Jun. 23, 2022 the entire contents of which are incorporated herein by reference.

TECHNICAL FIELD

Embodiments of the present disclosure relates to a seatbelt device of a vehicle, and more particularly, to a vehicle to which a seat belt wearing monitoring method is applied.

BACKGROUND

To protect a passenger in an autonomous driving vehicle, the passenger must normally wear a seat belt. When the passenger is not wearing a seat belt, there is no way for the passenger to be protected in the event of an accident. Therefore, there is a need for a technology of inducing the passenger to normally wear the seat belt.

In the related art, by using an on/off switch embedded in a buckle for fastening the seat belt, whether the passenger is wearing the seat belt was detected. When the seat belt is not fastened to the buckle, an alarm warning to wear the seat belt was generated. However, when the passenger fastens a fake tongue to the buckle without wearing the seat belt or abnormally fastens the seat belt to the buckle, there is a problem in that this may not be detected.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a seat belt device of a vehicle having an advantage of detecting whether a seat belt is worn normally or as desired.

In one aspect a seat belt apparatus of a vehicle is provided, the seat belt apparatus comprising: (a) a seat belt coupled to a seat and comprising a webbing comprising a detectable material or a paint in at least one pattern; (b) a vision sensor configured to generate an image by capturing a field of view region comprising the seat; and (c) a monitoring system configured to detect the detectable material pattern coated with the at least one paint in the image, and determine whether a user wears the seat belt i) correctly or as desired or ii) erroneously wears the seat belt based on the detected detectable material. In certain embodiments, the seat belt suitably comprises a webbing that comprises the detectable material. In certain embodiments, the webbing comprises the detectable material coated as a paint in at least one pattern.

In a preferred aspect, a seat belt apparatus of a vehicle is provided that comprises a seat belt coupled to a seat and including a webbing coated with a paint in at least one pattern; a vision sensor configured to generate an image by capturing a field of view region including the seat; and a monitoring system configured to detect a length of the webbing based on the pattern coated with the at least one paint in the image, and determine whether a user wears the seat belt i) correctly or as desired or ii) erroneously wears the seat belt based on the detected length of the webbing.

The webbing may include a webbing having a regular order with area and length information, and implemented in a paint coating pattern having an infrared reflectance equal to or greater than a predetermined range.

The detectable material or paint coating pattern may form a webbing structure including an infrared paint coating pattern having a unique number of a certain size, and the seat belt apparatus may determine an amount of webbing withdrawal by the paint coating pattern.

The detectable material or paint coating pattern may be implemented in post-painting or implemented in yarn pre-painting coating.

The monitoring system suitably may detect a pattern matching a specific pattern in the image, and detect a length of a webbing withdrawn according to the number of patterns matching the detected specific pattern.

The monitoring system suitably may derive at least two regions of interest (ROIs) from the image, and calculate a withdrawn webbing length based on common predetermined areas of the derived at least two ROIs.

The monitoring system suitably may calculate the withdrawn webbing length by comparing a number of the pattern detected at an uppermost end of a wearing ROI among the derived at least two ROIs with a number of the pattern detected at an uppermost end of a non-wearing ROI among the derived at least two ROIs.

The monitoring system suitably may compare a predetermined reference webbing length range and the detected length of the withdrawn webbing, and determine whether the user wears the seat belt or erroneously wears the seat belt based on a comparison result.

The monitoring system suitably may detect a number of patterns detected in the wearing ROI among the derived at least two ROIs after the seat belt is worn.

The monitoring system suitably may determine that the user normally wears the seat belt when the withdrawn webbing length is within the reference webbing length range and the number of patterns detected in the wearing ROI is greater than or equal to the reference number range.

The monitoring system suitably may generate a re-capturing control command with respect to the vision sensor and transmit the re-capturing control command to the vision sensor when it is determined that the user erroneously wears the seat belt.

The vision sensor suitably may generate an image by re-capturing a field of view region according to the re-capturing control command, and transmit the image generated through re-capturing to the monitoring system.

The monitoring system suitably may control a speaker or a display of the vehicle to perform a notification to warn the user to wear the seat belt before re-capturing when it is determined that the user erroneously wears the seat belt.

The monitoring system suitably may use image matching or a convolution neural network (CNN) algorithm in order to derive the pattern matching the specific pattern from the image.

The monitoring system suitably may select one of a plurality of patterns from a plurality of frames constituting the image, track a displacement of the pattern selected at all times in each of the plurality of frames, and estimate a respiration rate.

The monitoring system suitably may track a displacement of each of an x-axis and a y-axis of the selected pattern, count the number of times a length of each of the x-axis and the y-axis increases and decreases, and estimate the respiration rate.

The at least one pattern suitably may include a pattern according to an n×n number system, wherein n is a natural number equal to or greater than 3.

The at least one pattern may include a pattern with a rule according to at least one of a figure, a logo, a letter, and a number.

The at least one pattern may include a pattern including a plurality of patterns with no rule in a specific order.

The seat belt device of the vehicle capable of detecting whether the seat belt is worn normally is provided.

As referred to herein, the term paint can include for example any coating or marking material or datable material, including an integral material (i.e. a material that is integral to the material of construction of the seatbelt including seatbelt webbing) and that provides the functions as disclosed herein, for example where the paint can function with the monitoring system.

As discussed, the method and system suitably include use of a controller or processer.

In another embodiment, vehicles are provided that comprise an apparatus as disclosed herein.

DETAILED DESCRIPTION OF THE EMBODIMENTS

Figure 1:
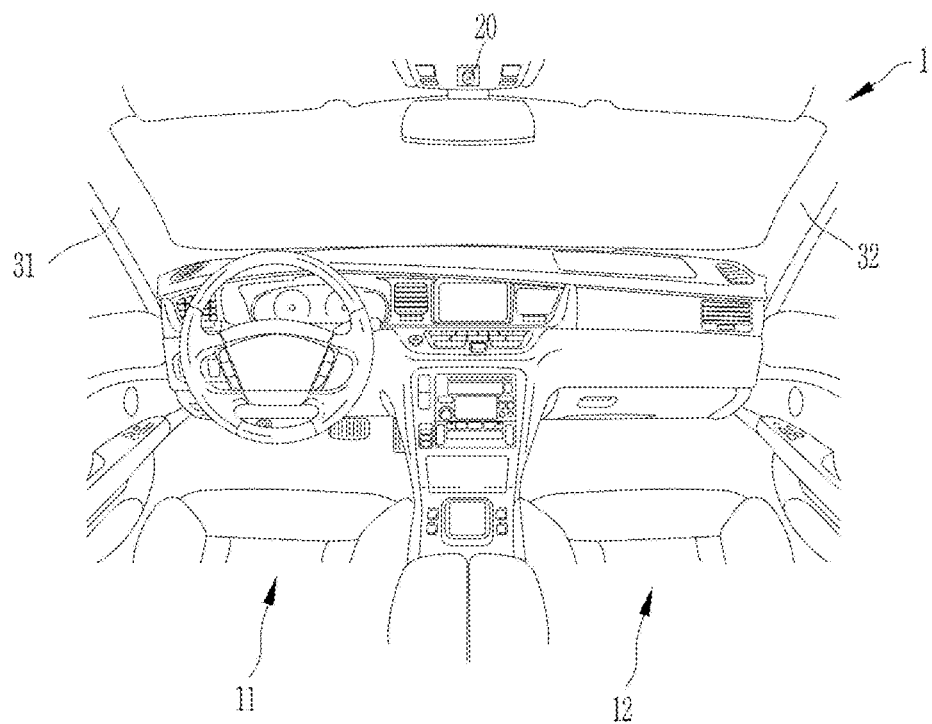
FIG. 1 is a diagram illustrating the interior of the vehicle in a direction looking at a windshield in the interior of the vehicle.

Hereinafter, the embodiments disclosed in the present specification will be described in detail with reference to the accompanying drawings, but same or similar components are given the same or similar reference numerals, and redundant descriptions thereof will be omitted.

The suffixes "module" and/or "part" for components used in the following description are given or mixed in consideration of only the ease of drafting the specification, and do not have meanings or roles distinct from each other by themselves. In addition, in describing the embodiments disclosed in the present specification, when it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, do not limit the technical idea disclosed in the present specification, and should be understood to include all changes, equivalents or substitutes included in the spirit and scope of the present disclosure.

The terms including an ordinal number, such as first, second, etc., may be used to describe various components, but the components are not limited by the terms. These terms are used only for the purpose of distinguishing one component from another.

It will be understood that when a component is referred to as being "connected to" or "coupled to" another component, it may be connected or coupled to the other component or intervening components may be present. In contrast, when a component is referred to as being "directly connected to" or "directly coupled to" another component, there are no intervening components present.

It will be further understood that the terms "comprises" and/or "comprising," when used in the present specification, specify the presence of stated features, integers, steps, operations, components, and/or parts, but do not preclude the presence or addition of one or more other features, integers, steps, operations, components, parts, and/or combinations thereof.

In addition, the terms "-er", "-or", and "module" described in the specification mean units for processing at least one function and operation, and can be implemented by hardware components or software components, and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

A program implemented as a set of instructions embodying a control algorithm necessary to control another configuration may be installed in a configuration controlling another configuration under a specific control condition among configurations according to an embodiment. The control configuration may process input data and stored data according to the installed program to generate output data. The control configuration may include a non-volatile memory to store a program and a memory to store data.

A monitoring system according to an embodiment may identify a webbing path of a seat belt by using a vision sensor, and determine whether the seat belt is worn i) normally or as desired or ii) abnormally worn (hereinafter, erroneous wearing) based on the identified webbing path. The vision sensor may include an RGB camera and an infrared (IR) camera. The monitoring system may include a classification module implemented as an artificial intelligence (AI) algorithm, for example, a CNN algorithm. Furthermore, a vehicle including the monitoring system according to an embodiment may include a seat belt in which a paint is applied to a webbing surface. The paint may be implemented as an IR high reflective paint, or other material that is suitably detected by a monitoring system. Furthermore, a webbing may comprise a detectable material e.g. be coated with a paint according to a predetermined pattern. Through this, a pattern of an image obtained by the vision sensor may be easily and quickly detected by the monitoring system.

Hereinafter, an apparatus and method for detecting seat belt wearing according to an embodiment will be described with reference to necessary drawings.

Figure 2:
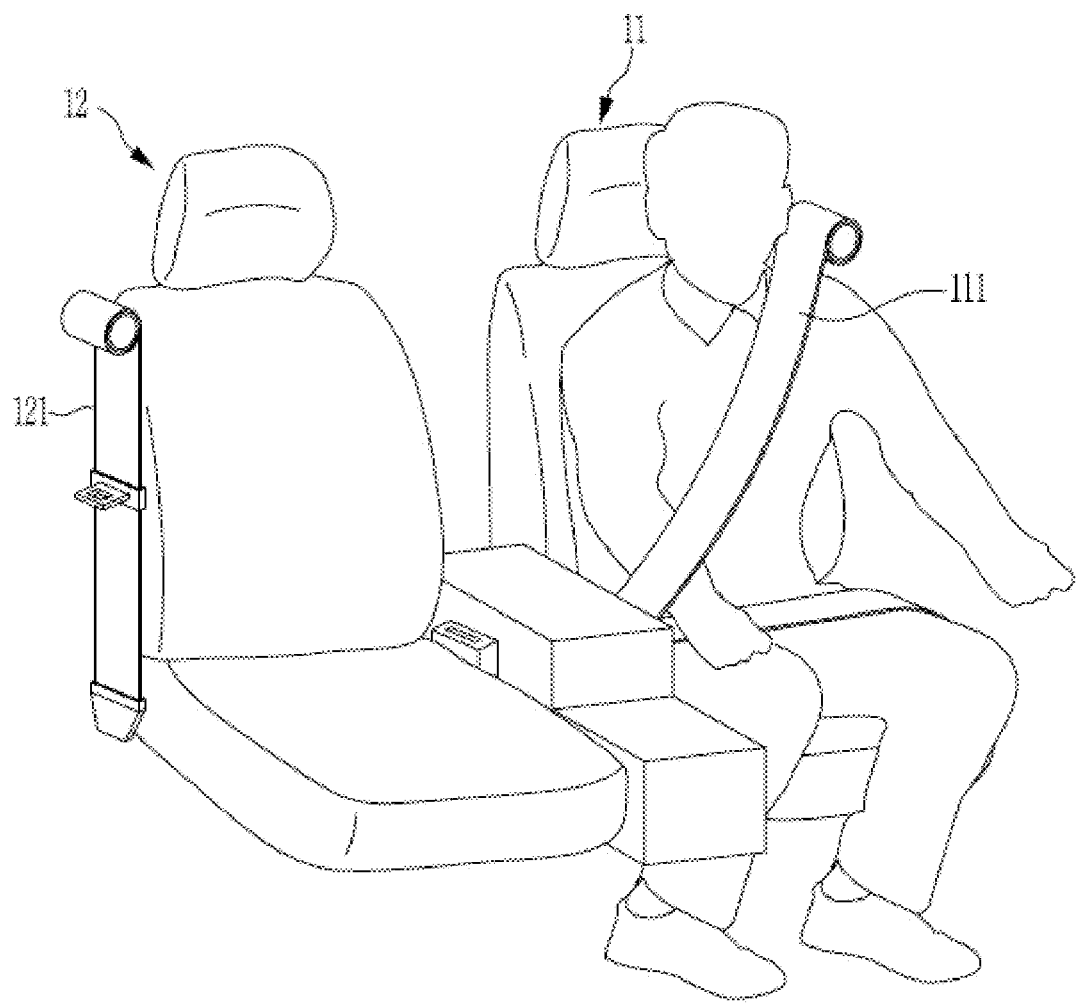
FIG. 2 is a diagram illustrating the interior of the vehicle in a direction looking at the interior in the windshield of the vehicle.

FIGS. 1 and 2 are diagrams illustrating a part of an interior of a vehicle according to an embodiment.

FIG. 1 is a diagram illustrating the interior of the vehicle in a direction looking at a windshield in the interior of the vehicle.

FIG. 2 is a diagram illustrating the interior of the vehicle in a direction looking at the interior in the windshield of the vehicle.

As shown in FIGS. 1 and 2, a vehicle 1 may include a driver seat 11, a passenger seat 12, seat belts 111 and 121, and a vision sensor 20. In FIG. 1, it is illustrated that one vision sensor 20 is located on an overhead console 30, but the positions and number of the vision sensors 20 are not limited thereto, and may be positions and number at which an image of a user seated in the driver seat 11 or the passenger seat 12 may be obtained. For example, two vision sensors may be positioned on A pillars 31 and 32 of the vehicle 1.

In FIG. 2, for convenience of explanation, it is illustrated that the user is seated in the driver seat 11 and wears the seat belt 111. However, the user may ride not only in the passenger seat 12 but also in a rear seat, and an embodiment may be applied even when the user riding in the rear seat wears a seat belt.

Although only a vision sensor capable of obtaining an image of a front seat is illustrated in FIG. 1, a vision sensor capable of obtaining an image of a rear seat may be provided in the vehicle 1. In this case, the positions and number of vision sensors for the rear seat may be the positions and number at which a clear image of the user seated in the rear seat may be obtained. For example, two vision sensors may be located on a B pillar of the vehicle 1.

The vision sensor 20 may generate at least one of an RGB image and an infrared (IR) image for a field of view region. The vision sensor 20 may include an IR camera and an RGB camera. The RGB camera may be implemented as a CMOS image sensor, and the IR camera may be implemented as a quantum infrared sensor or a thermal infrared sensor.

Webbing constituting the seat belts 111 and 121 according to an embodiment may be coated with a detectable material e.g. paint according to an arbitrary pattern. At this time, the pattern of the detectable material e.g. paint coated on the webbing of the seat belts 111 and 121 may be at least one type. The paint may have an IR reflectance equal to or greater than a predetermined range (e.g., 20% to 30%). When visible light is insufficient, such as in a dark night or in a tunnel (when natural light is less than a predetermined threshold), it may be difficult to recognize a seat belt in an image captured by the RGB camera. In an environment where the visible light is insufficient, the IR camera may generate an image by capturing a field of view. At this time, in this illustrative system, since the webbing of the seat belts 111 and 121 is coated with the detectable material or paint in at least one pattern, the webbing of the seat belts 111 and 121 may be identified from the image generated by the IR camera.

A method of forming a pattern with a detectable material or e.g. paint on a surface of the webbing may be a post-painting method or a yarn pre-painting method. The post-painting method is a method of painting a completely fabricated webbing with a paint using a silk screen or a colored paint according to a specific pattern. The yarn pre-painting method is a method of firstly painting a yarn (warp or weft) at a location corresponding to a specific pattern with a paint, weaving the warp and the weft, and fabricating a webbing. Although the pre-painting method is more complicated than the post-painting method, the pre-painting method may be superior in terms of coating durability.

In an embodiment, the webbing may include a webbing implemented as a detectable material e.g. paint coating pattern having a regular order including area and length information, and having an infrared reflectance greater than or equal to a predetermined range. The paint coating pattern may form a webbing structure including an infrared paint coating pattern having a unique number of a certain size. The monitoring system 2 may determine an amount of webbing withdrawal by the paint coating pattern. The detectable material e.g. paint coating pattern may be implemented in post-painting or may be implemented by yarn pre-painting coating. Alternatively, the detectable material e.g. paint coating pattern may be implemented in post-painting and by yarn pre-painting coating.

Figure 3:
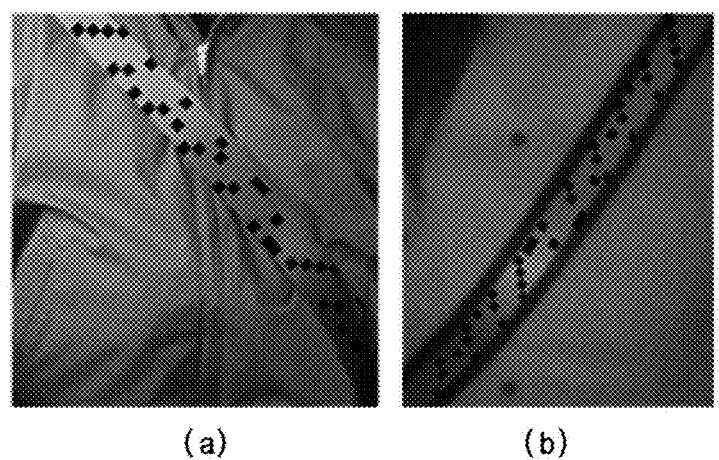
FIG. 3 is a diagram illustrating webbing of a seat belt coated with a paint according to an embodiment.

FIG. 3 is a diagram illustrating webbing of a seat belt coated with a paint according to an embodiment.

Patterns shown in FIG. 3 are an example, and the disclosure is not limited thereto.

FIG. 3(a) is an image obtained by an RGB camera, and FIG. 3(b) is an image obtained by an IR camera. As shown in FIG. 3(a), under the condition that an amount of natural light is equal to or greater than a threshold, webbing patterns may be clearly recognized in the image generated by the RGB camera. Under the condition that it is difficult to obtain a clear image with the RGB camera when the amount of natural light is less than the threshold, webbing patterns may be clearly recognized in the image generated by the IR camera.

Figure 4A:
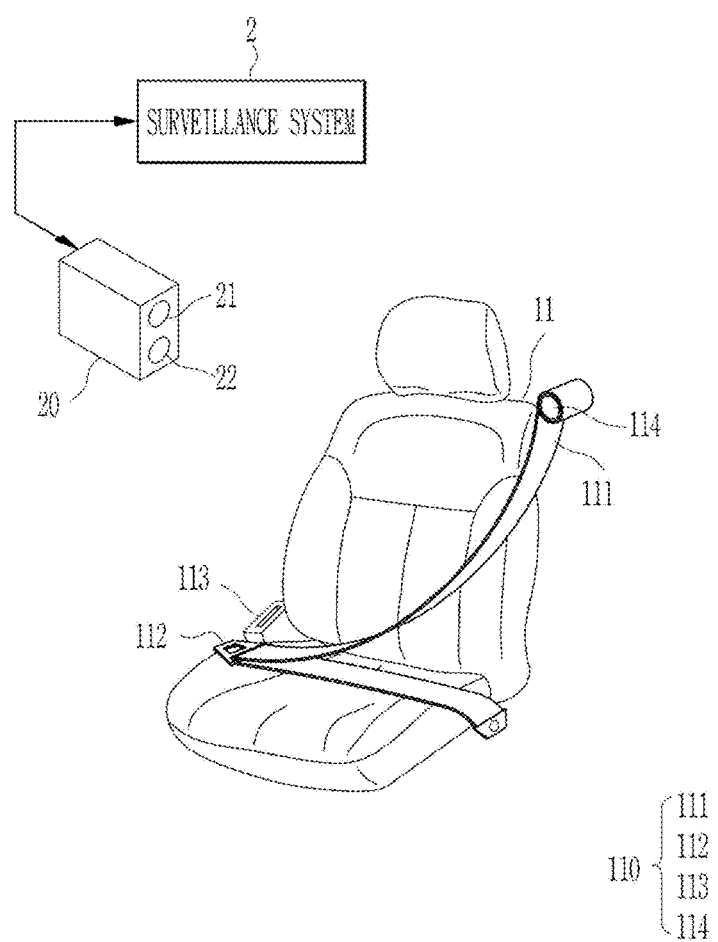
FIG. 4A is a diagram schematically illustrating a seat, a seat belt apparatus, a monitoring system, and a vision sensor according to an embodiment.

FIG. 4A is a diagram schematically illustrating a seat, a seat belt apparatus, a monitoring system, and a vision sensor according to an embodiment.

The seat shown in FIG. 4A is the driver seat 11 in which a user is not seated.

Figure 4B:
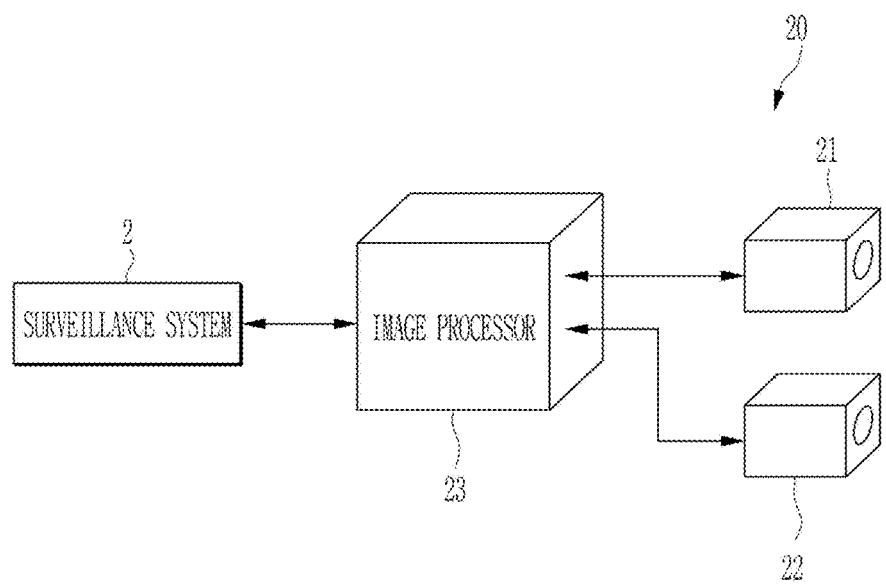
FIG. 4B is a block diagram illustrating a vision sensor according to an embodiment.

FIG. 4B is a block diagram illustrating a vision sensor according to an embodiment.

As shown in FIG. 4A, a seat belt device 110 may include a seat belt 111, a seat belt tongue plate 112, a buckle 113, and a seat belt bundle 114. The seat belt 111 may include webbing coated with a paint. That a user wears a seat belt means that the user is seated in a seat (for example, the driver seat 11 in FIG. 4), moves the seat belt 111, and fastens the seat belt tongue plate 112 to the buckle 113.

The vision sensor 20 may generate an image by capturing a field of view including a seat (e.g., the driver seat 11 of FIG. 4A). Hereinafter, this image is referred to as an image. The vision sensor 20 includes an RGB camera 21, an IR camera 22, and an image processor 23.

The vision sensor 20 may be triggered by an ignition-on to generate the image of the seat. After obtaining information about the ignition-on from the vehicle 1, the monitoring system 2 may be synchronized with the ignition-on to control the vision sensor 20 and generate the image. Specifically, when a trigger signal is transmitted from the monitoring system 2 to the image processor 23, the image processor 23 may transmit a signal (hereinafter, a capturing instruction signal) instructing capturing to at least one of the RGB camera 21 and the IR camera 22. At least one of the RGB camera 21 and the IR camera 22 may obtain the image by capturing a field of view region and transmit the image to the image processor 23. The image may include at least one of an RGB image and an IR image.

The image processor 23 may transmit at least one of the received RGB image and IR image to the monitoring system 2. In this regard, the image processor 23 may transmit one of the RGB image and the IR image to the monitoring system 2 according to a request of the monitoring system 2. The monitoring system 2 may transmit a control command for selecting one of the RGB camera 21 and the IR camera 22 to the image processor 23 according to the amount of natural light. The image processor 23 may operate one of the RGB camera 21 and the IR camera 22 according to the control command. In contrast, the image processor 23 may operate both the RGB camera 21 and the IR camera 22 according to the trigger signal, and select one of the RGB image and the IR image according to the control command and transmit the selected image to the monitoring system 2.

The trigger signal may not be synchronized with the ignition-on, but may be generated in synchronization with seating of the user. The seating of the user may be detected by a pressure sensor provided in a seat. The vehicle 1 may receive a detection signal from the pressure sensor of each seat, and detect a seat on which the user sits based on the received detection signal. For example, when seating of the user is detected in the driver seat 11, the vehicle 1 may notify the monitoring system 2 of this, and the monitoring system 2 may generate the trigger signal and transmit the trigger signal to the vision sensor 20. Subsequent operations are the same as those described above, and thus descriptions thereof will be omitted.

By coating the webbing with a specific pattern with a paint, the monitoring system 2 may detect a length of a withdrawn webbing using the image and determine whether the user wears the seat belt. The withdrawn webbing refers to a webbing of the seat belt 111 exposed to the outside so as to be visually recognized when the user wears the seat belt 111.

The monitoring system 2 may detect the length of the withdrawn webbing when detecting a pattern matching a specific pattern in the image. The monitoring system 2 may detect the pattern matching the specific pattern in the image, estimate the number of patterns matching the detected specific pattern, calculate the length of the webbing withdrawn from the seat belt 111 according to the estimated number of patterns, and determine whether the user wears the seat belt based on the length of the withdrawn webbing. The specific pattern may be one of a plurality of preset patterns. In an embodiment, a plurality of specific patterns for determining whether the seat belt is worn or erroneously worn may be preset and stored in the monitoring system 2.

The monitoring system 2 may derive a region of interest (ROI) from the image.

Figure 5A:
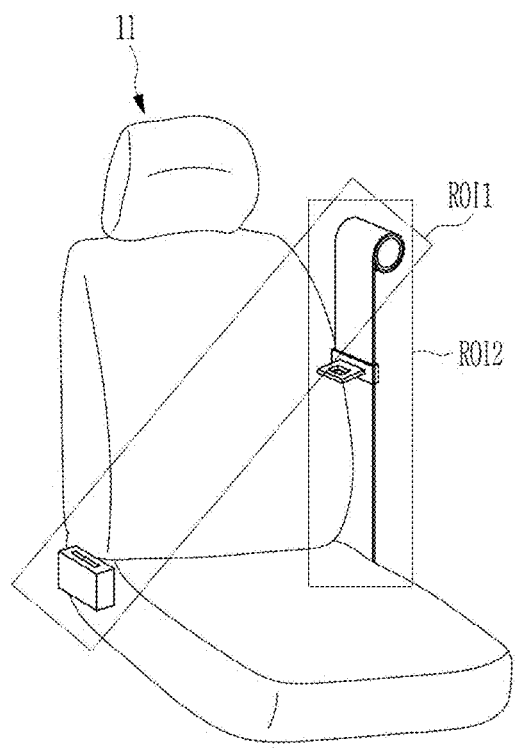
FIGS. 5A and 5B are diagrams illustrating a region of interest in an image according to an embodiment.
Figure 5B:
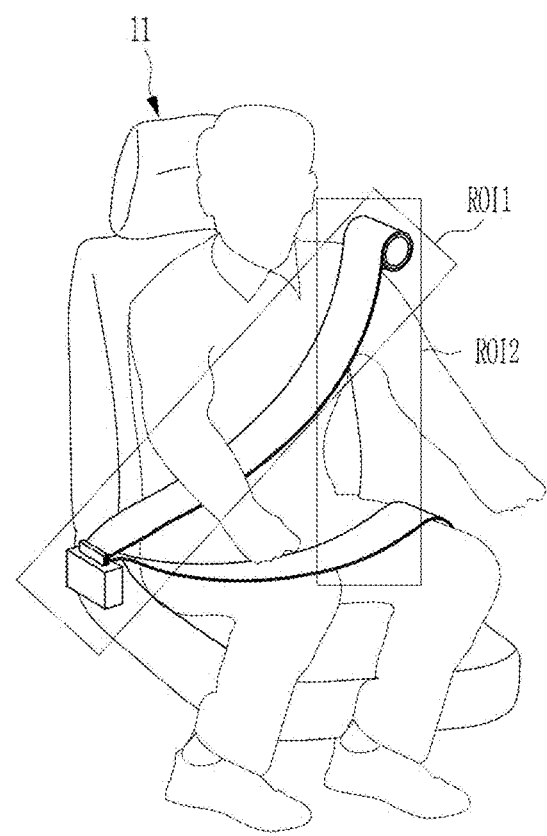

FIGS. 5A and 5B are diagrams illustrating an ROI in an image according to an embodiment.

As shown in FIGS. 5A and 5B, at least two ROIs ROI1 and ROI2 may exist in the image. As shown in FIG. 5A, when a user does not sit on a seat and does not wear a seat belt, the seat belt is located in the ROI ROI2 in the image. The ROI ROI2 is a region in which the seat belt is located when the user does not wear the seat belt (hereinafter referred to as a non-wearing region).

As shown in FIG. 5B, when the user is seated on the seat, the seat belt may be located in the ROI ROI1 in the image. The ROI ROI1 is a region in which the seat belt is located when the user wears the seat belt (hereinafter, referred to as a wearing region).

The monitoring system 2 may derive at least two ROIs from the image, and determine whether to detect a pattern according to which ROI the seat belt is located among the derived at least ROIs. For example, the monitoring system 2 does not perform pattern detection in the ROI ROI1 that is the wearing region and stores only the pattern detected in the ROI ROI2 that is the non-wearing region when the seat belt is located in the ROI ROI2 that is the non-wearing region. Unlike this, the monitoring system 2 may perform pattern detection on the ROI ROI1 when the seat belt is located in the ROI ROI1 that is the wearing region.

Figure 6:
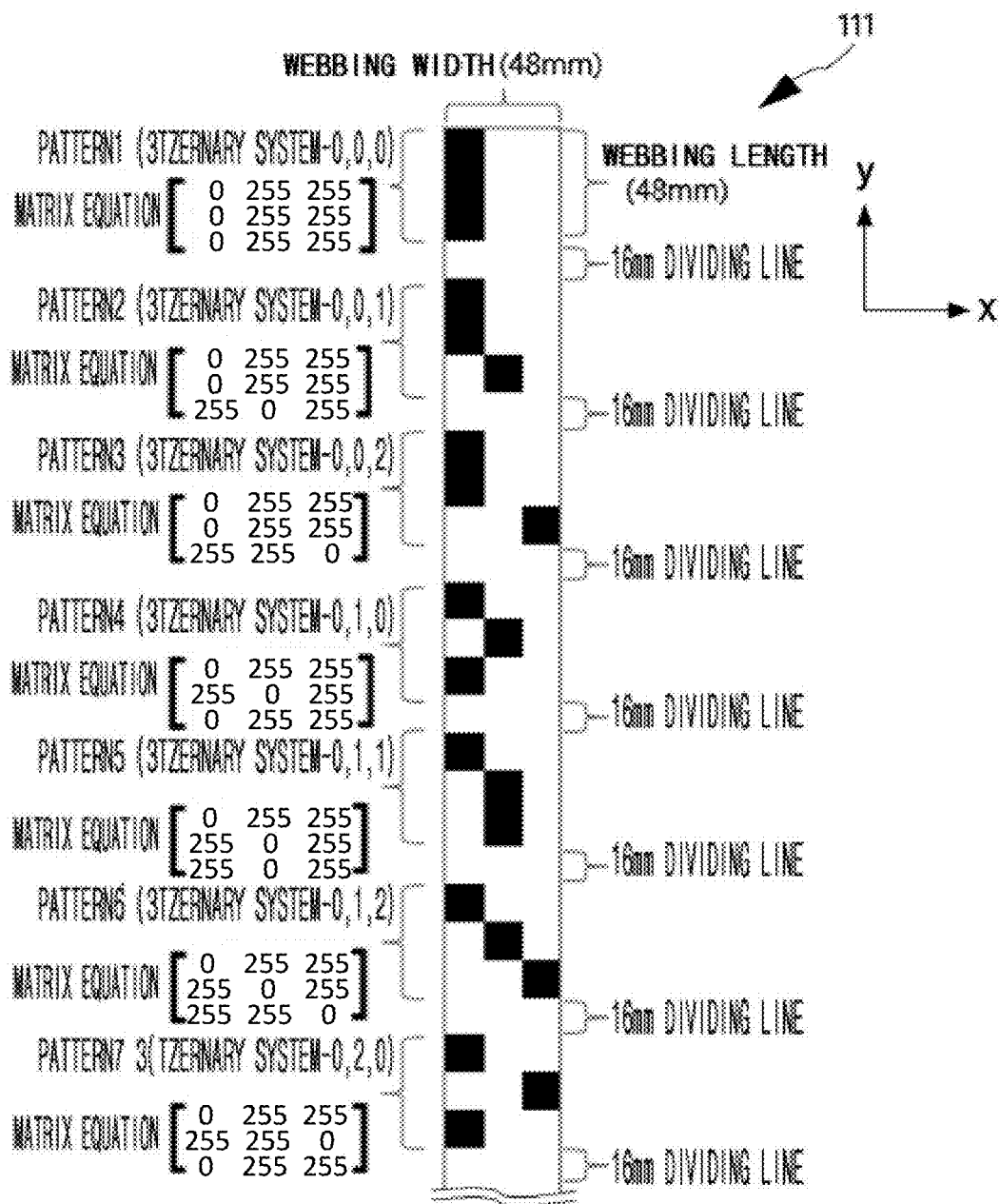
FIG. 6 is a diagram illustrating a plurality of patterns that may be coated on a webbing according to an embodiment.

FIG. 6 is a diagram illustrating a plurality of patterns that may be coated on a webbing according to an embodiment.

In FIG. 6, a plurality of patterns of a ternary system are illustrated, but the disclosure is not limited thereto, and other number systems (e.g., 4×4, 5×5, . . . ) may be applied to an embodiment.

In addition, a method of coating a specific pattern, logo, picture, text, etc. on the webbing in a predetermined order may be applied to an embodiment. That is, although a square shape is used as an example of the pattern in FIG. 6, the disclosure is not limited thereto, and other figures, logos, letters, numbers, etc. may be used.

Figure 7:
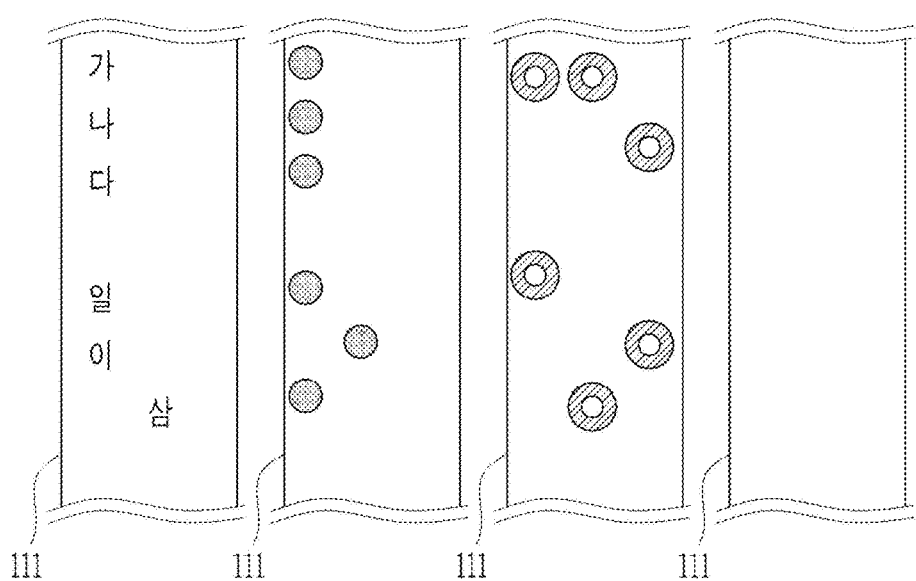
FIG. 7 is a diagram illustrating various patterns that may be coated on a webbing according to an embodiment.

FIG. 7 is a diagram illustrating various patterns that may be coated on a webbing according to an embodiment.

As shown in FIG. 7, in addition to a black square shape, Hangul (가, 나, 다, 일,이,삼, . . . ), English, Chinese characters, other shapes (a circular shape and a donut shape), logo ( ), etc. may be used.

In addition, if patterns with no special rule are coated on the webbing in a specific order, the monitoring system 2 may detect the patterns in an image.

Figure 8:
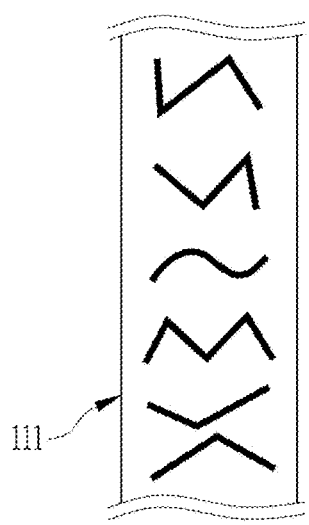
FIG. 8 is a diagram illustrating patterns with no rule that may be coated on a webbing according to an embodiment.

FIG. 8 is a diagram illustrating patterns with no rule that may be coated on a webbing according to an embodiment.

As shown in FIG. 8, when a plurality of patterns with no rule are coated according to a specific order, the monitoring system 2 may detect a length of the webbing by recognizing the coating order of the plurality of patterns.

As such, when the order in which the patterns with no rule are coated is set as a reference pattern in the monitoring system 2, the monitoring system 2 may detect the webbing length by deriving a region matching the reference pattern from the image.

In FIG. 6, the length of one pattern is 64 mm including a dividing line. In FIG. 6, a length in the y direction is referred to as a pattern length. The role of the dividing line is to prevent misrecognition of adjacent patterns by using spaces between the adjacent patterns. A y-direction length of the dividing line (hereinafter referred to as the dividing line length) may be appropriately set according to a format and shape of the pattern. For example, when the probability of misrecognition of a pattern is very low, there may be no dividing line. Alternatively, as the probability of misrecognition of a pattern increases, the dividing line length may increase up to the length of one pattern. Although the dividing line is shown as a blank in FIG. 6, a webbing region corresponding to the dividing line may be coated with a specific color, or a pattern or pattern for the dividing line may be coated on the webbing region corresponding to the dividing line.

The plurality of patterns coated on the webbing region may be implemented in a matrix form. For example, with respect to Open Source Computer Vision (OpenCV) grayscale, a grayscale value of a white pixel may be 255 and a grayscale value of a black pixel may be expressed as 0 in the pattern in the matrix form. The pattern in the matrix form includes only the white pixel and the black pixel, and white and black are the farthest values from each other in grayscale. Therefore, the monitoring system 2 may easily detect the pattern shown in FIG. 6. The monitoring system 2 may be an image matching method or a Convolution Neural Network (CNN) algorithm in order to derive a pattern matching a specific pattern from an image. As the image matching method, one of various known methods such as average hash matching, template matching, and feature matching may be applied to an embodiment.

In FIG. 6, patterns 1 to 7 are shown among the plurality of patterns of the ternary system. The number of patterns derivable in the ternary system is 27 in total, and although not shown in FIG. 6, the remaining 21 patterns may be coated on the seat belt 111. However, the disclosure is not limited thereto, and some patterns (e.g., patterns 1 to 7) among the total of 27 patterns may be repeated.

The webbing length and width of one pattern is 48 mm, and the length of the dividing line is 16 mm. Accordingly, when there are 27 types of patterns applied to the seat belt 111, the length of the webbing coated with the 27 patterns on the seat belt 111 is 1728 mm [27*(48+16)]. The webbing may be repeatedly patterned with 27 pattern units. In general, the maximum length of the webbing withdrawn to the outside in a seat belt is 1600 to 1800 mm, and the length of the webbing with which the seat belt is withdrawn from the user's shoulder across the body may be about 900 mm based on the Bet In Seat (BIS) standard. A reference webbing length range may be set based on the length of the withdrawn webbing.

The monitoring system 2 may store the pattern detected at the uppermost end of the ROI (ROI2), and calculate a withdrawn webbing length by comparing the number of the pattern detected at the same position as the uppermost end of the ROI (ROI2) among the patterns detected in the ROI (ROI1) with the number of the pattern detected at the uppermost end of the ROI (ROI2) after the seat belt is worn. For example, in the case of the ternary system pattern shown in FIG. 6, if the number of the pattern detected at the uppermost of the ROI (ROI2) is No. 1 and the number of the pattern detected at the uppermost end of the ROI (ROI1) after wearing the seat belt is No. 14, the monitoring system 2 can calculate 832 mm (=|1−14|×64 mm) as the withdrawn webbing length.

The monitoring system 2 may compare the reference webbing length range with the withdrawn webbing length, and based on a comparison result, determine whether the user wears the seat belt or erroneously wears the seat belt.

In order to finally determine whether the user wears the seat belt normally or erroneously, the monitoring system 2 may count the number of patterns detected in the ROI (ROI1) after wearing the seat belt along with the withdrawn webbing length. For example, in the case of the ternary system shown in FIG. 6, the monitoring system 2 may determine whether five or more patterns are detected in the region of ROI (ROI1) after the seat belt is worn. When the withdrawn webbing length is within the reference webbing length range and the number of patterns detected in the ROI (ROI1) after the seat belt is worn is greater than or equal to the reference number range, the monitoring system 2 may determine that the user normally wears the seat belt.

Conversely, the monitoring system 2 may determine that the user does not wear the seat belt or erroneously wears the seat belt if the withdrawn webbing length is beyond the reference webbing length range or the number of patterns detected in the ROI (ROI1) after the seat belt is worn is less than the reference number range. It is referred to as a wearing detection failure, including the user not wearing the seat belt or erroneously wearing the seat belt. The monitoring system 2 may generate a re-capturing control command with respect to the vision sensor 20 and transmit the command to the vision sensor 20 when determining the wearing detection failure. The monitoring system 2 may control a speaker and a display provided in the vehicle 1 to perform a notification to warn the user to wear the seat belt before re-capture when determining the wearing detection failure.

In response to the re-capturing control command, the vision sensor 20 may re-capture a field of view region and generates an image. The vision sensor 20 transmits the image generated through re-capture to the monitoring system 2, and the monitoring system 2 performs pattern detection on the image again to determine whether the user wears the seat belt or erroneously wears the seat belt one more time.

The monitoring system 2 may repeat determination of whether the user wears the seat belt or erroneously wears the seat belt at least one time based on the image generated by re-capture (hereinafter, a re-captured image). The monitoring system 2 may finally determine whether the user wears the seat belt as the wearing detection failure when the determination based on the re-captured image is the wearing detection failure.

In an embodiment, the OpenCV library is used, but the disclosure is not limited thereto. In an embodiment, the pattern coated on the webbing may be a simple pattern advantageous for recognition, another programming library for a simple pattern may be used instead of OpenCV, and another programming language may be used. According to the library or language used, the shape of the pattern to be coated on the webbing may be set.

The monitoring system 2 may select one of a plurality of patterns (hereinafter, a representative pattern) from a plurality of frames constituting the image, track a displacement of the representative pattern in each of the plurality of frames, and estimate a respiration rate. The monitoring system 2 may track the displacement of each of x-axis and y-axis, count the number of times the length of each of x-axis and y-axis increases and decreases, and estimate the respiration rate. When inhaling, the lengths of x-axis and y-axis may increase, and when exhaling, the lengths of x-axis and y-axis may decrease. The monitoring system 2 may determine whether the user wears the seat belt or incorrectly wears the seat belt based on the length of the withdrawn webbing, and additionally estimate a user's respiration rate, thereby more accurately determining whether the user wears the seat belt or incorrectly wears the seat belt.

Furthermore, the monitoring system 2 may estimate the number of respirations per minute of the user. For example, the monitoring system 2 may estimate the respiration rate per minute using Equation 1 when the user breathes n times in a plurality of frames of the image.

Number of respirations per minute=(number of frames per second)*60/(number of a plurality of frames during breathing $n$ times)*($n$ times)  [Equation 1]

As mentioned above, the monitoring system 2 may be implemented through a CNN algorithm. Since the CNN algorithm applied to the monitoring system 2 is trained to recognize patterns coated on the webbing, training data based on the patterns coated on the webbing may be used.

When patterns with a rule are coated on the webbing, the types and number of all patterns according to the rule may be determined, and training data may also be determined based on the types and number of the total patterns. In addition, even in the case of patterns with no rule, when the patterns are coated in a specific order, training data may also be determined based on the plurality of patterns arranged in the specific order.

As such, since the training data may be determined according to the types and number of patterns coated on the webbing, the amount of training data is not large.

Figure 9:
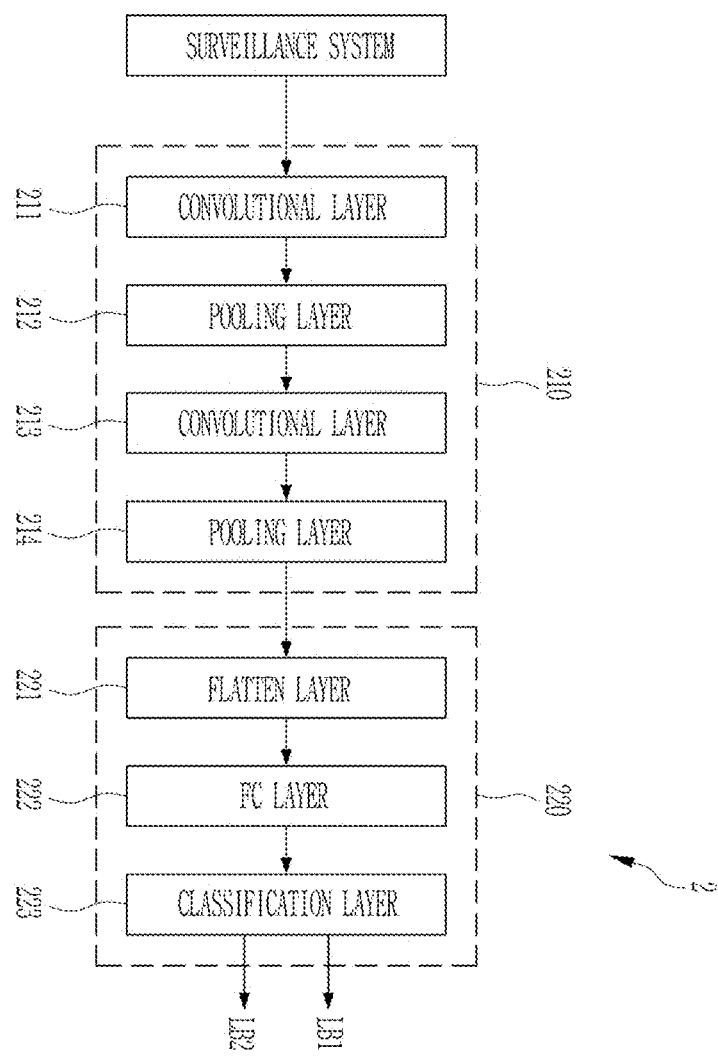
FIG. 9 is a diagram schematically illustrating a configuration of a monitoring system implemented in a CNN algorithm according to an embodiment.

FIG. 9 is a diagram schematically illustrating a configuration of a monitoring system implemented in a CNN algorithm according to an embodiment.

The monitoring system 2 may include a feature extraction module 210 for extracting a plurality of feature values with respect to an image and a classification module 220 for determining whether a seat belt is worn or erroneously worn based on the plurality of feature values.

The monitoring system 2 may include the feature extraction module 210 and the classification module 220. The feature extraction module 210 may include at least one convolutional layer, at least one pooling layer, and a flatten layer. In FIG. 7, as an example, the feature extraction module 210 is illustrated as including two convolutional layers 211 and 213 and two pooling layers 212 and 214.

When the image is input to the convolutional layer 211, the convolutional layer 211 may obtain a first feature map by applying a matrix-type filter to the input image. Information about a filter structure (size, number, value, etc.), a stride value, and a padding method may be preset in the feature extraction module 210. In addition, an activation function may be applied to the first feature map.

The pooling layer 212 may down-sample the first feature map, reduce the order of the first feature map, and obtain a second feature map. A down-sampling method may include max pooling, average pooling, etc.

The convolutional layer 213 may obtain a third feature map by applying a filter to the second feature map obtained by the pooling layer 212.

The pooling layer 212 may down-sample the third feature map, reduce the order of the third feature map, and obtain a fourth feature map.

The classification module 220 may include a flatten layer 221, at least one fully connected (FC) layer 222, and a classification layer 223. Although the classification module 220 is illustrated as including one FC layer 222 in FIG. 7, the disclosure is not limited thereto.

The flatten layer 221 may unfold data constituting the fourth feature map and transform the data into a plurality of pieces of one-dimensional vector data. The plurality of pieces of one-dimensional vector data may be input to the FC layer 222.

The FC layer 222 may apply weights to a plurality of inputs, apply the plurality of inputs to which the weights are applied to an activation function, and generate a plurality of outputs. The plurality of outputs of the FC layer 222 may be input to the classification layer 223.

The classification layer 223 may provide final probabilities LB1 and LB2 with respect to classification labels based on the plurality of outputs of the FC layer 222. The classification labels according to an embodiment may be two indicating whether a user normally wears a seat belt including a label 1 indicating a normal wearing detection and a label 2 indicating a wearing detection failure.

The monitoring system 2 may determine normal wearing when the probability LB1 of the label 1 is higher than the probability LB2 of the label 2. Conversely, the monitoring system 2 may determine the wearing detection failure when the probability LB2 of the label 2 is higher than the probability LB1 of the label 1.

Figure 10:
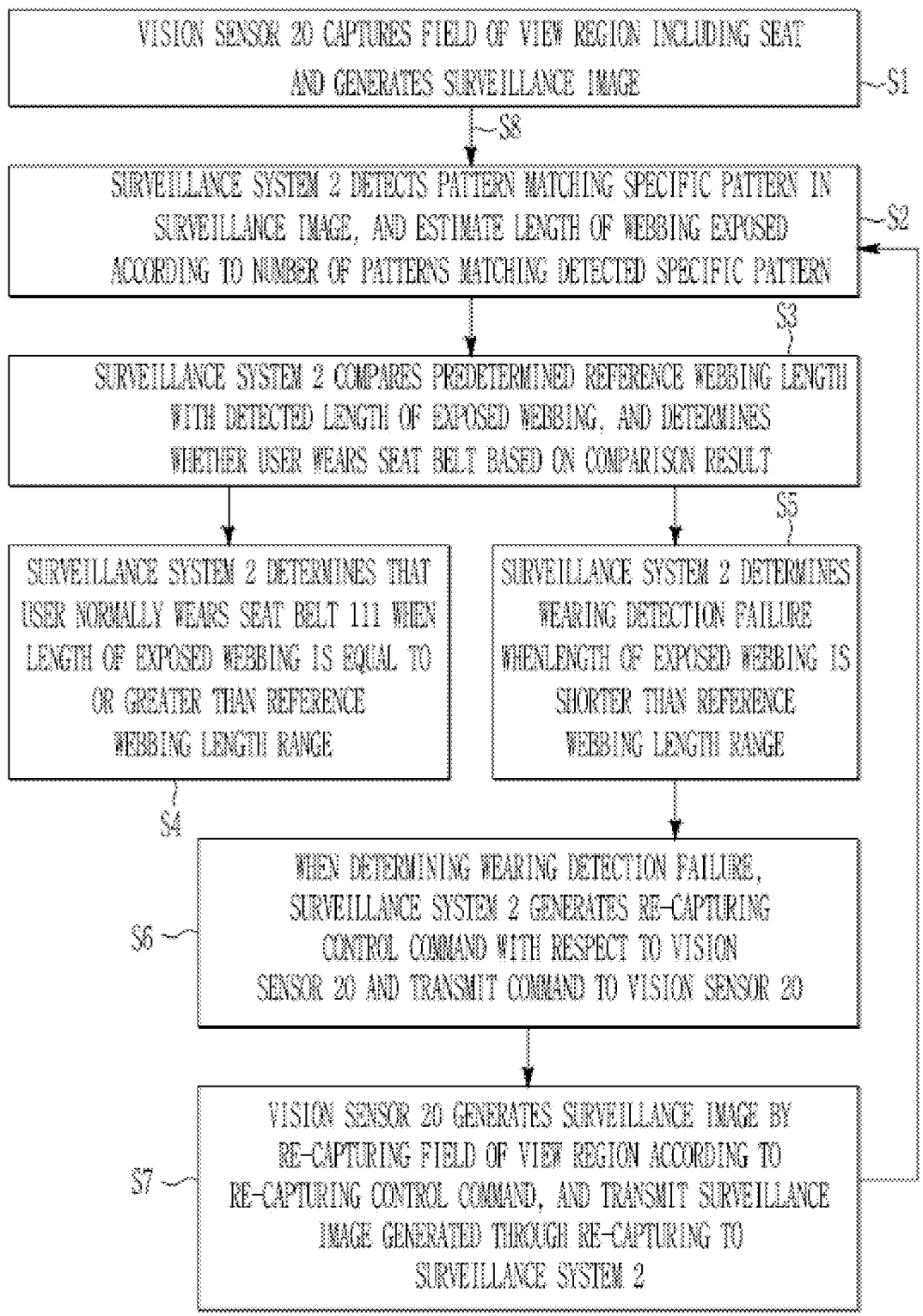
FIG. 10 is a flowchart illustrating a seat belt wearing monitoring method according to an exemplary embodiment.

FIG. 10 is a flowchart illustrating a seat belt wearing monitoring method according to an exemplary embodiment.

The vision sensor 20 may capture a field of view region including a seat and generates an image (S1).

The monitoring system 2 may detect a length of a webbing of the seat belt 111 coated with at least one pattern in the image, and determine whether a user wears the seat belt 111 based on the detected length of the webbing.

First, the monitoring system 2 may detect a pattern matching a specific pattern in the image, and detect a length of a webbing withdrawn according to the number of patterns matching the detected specific pattern (S2).

The monitoring system 2 may compare a predetermined reference webbing length with the detected length of the withdrawn webbing, and determine whether the user wears the seat belt or erroneously wears the seat belt based on a comparison result (S3).

For example, the monitoring system 2 may determine that the user normally wears the seat belt 111 when the length of the withdrawn webbing is within a reference webbing length range (S4). Alternatively, the monitoring system 2 may determine a wearing detection failure when the length of the withdrawn webbing is beyond the reference webbing length range (S5).

When determining the wearing detection failure, the monitoring system 2 may generate a re-capturing control command with respect to the vision sensor 20 and transmit the command to the vision sensor 20 (S6).

The vision sensor 20 may generate an image by re-capturing the field of view region according to the re-capturing control command, and transmit the image generated through re-capturing to the monitoring system 2 (S7). Thereafter, steps may be repeated from step S2. The number of times of repetitions according to the wear detection failure may be set to at least two times.

Alternatively, the monitoring system 2 may derive at least two ROIs from the image, and determine whether to detect a pattern according to which ROI the seat belt 111 is located among the derived at least two ROIs (S8). For example, the monitoring system 2 may perform step S2 when the seat belt 111 is located in the ROI ROI1.

According to an embodiment, the pattern coated on the webbing may be easily and quickly detected using natural light or infrared light.

When the webbing is not coated with the pattern, the capacity of the monitoring system for recognizing the seat belt in the image may be very large compared to an embodiment. For example, when the monitoring system is implemented in an AI algorithm, it is necessary to learn a very large amount of image data to increase classification accuracy. Unlike this, the monitoring system according to an embodiment only needs to learn a plurality of set patterns. In addition, when the webbing is not coated with the pattern, more convolutional layers and pooling layers are required to implement the AI algorithm compared to an embodiment, and accordingly, the processing speed may be slower than in an embodiment. In addition, in an embodiment, the length of the webbing may be detected immediately, but when the webbing is not coated with the pattern, a separate algorithm for determining whether the seat belt is normally worn according to a path of the webbing recognized in the image is further necessary. That is, in the prior art in which the webbing is not coated with the pattern, in the case of erroneous wearing of the seat belt, even if the total length of the withdrawn webbing is different compared to normal wearing, this was not detected, or required a separate auxiliary sensor to detect. For example, when the webbing is not coated with the pattern, an auxiliary sensor such as a bobbin sensor was additionally used to determine whether the seat belt is normally worn. However, since the detection system according to an embodiment may detect the length of the webbing, the detection system may determine normal wearing or erroneous wearing without a separate auxiliary sensor.

Since the monitoring system according to an embodiment determines whether the seat belt is normally worn based on the image of the webbing coated with a specific pattern, even if only a small amount of data is learned, a feature value difference between the webbing and a non-webbing region may be very large. In particular, when the pattern is expressed in a matrix form, a feature value difference between adjacent rows and a feature value difference between adjacent columns is very large. By setting the specific pattern that is very different from a pattern of an object that may be located on the seat, such as clothes worn by the user, the accuracy of the monitoring system determining normal wearing may be improved. Moreover, the paint of an embodiment may be implemented as an IR high-reflection paint, and thus, even when natural light is insufficient, the accuracy of the monitoring system may remain high. When the monitoring system is implemented in the AI algorithm, because a feature value thereof is clearly revealed by a specific pattern, the number of layers is small, and thus the processing speed is fast.

The seat belt monitoring method according to the above-described exemplary embodiment may be executed through software. When the method is executed as software, the constituent means of the present disclosure are code segments that perform necessary tasks. The program or code segments may be stored on a processor readable medium or transmitted by a computer data signal coupled with a carrier wave in a transmission medium or a communication network.

The computer-readable recording medium includes all types of recording devices in which data readable by a computer system is stored. Examples of the computer-readable recording device include ROM, RAM, CD-ROM, DVD_ROM, DVD_RAM, magnetic tape, floppy disk, hard disk, optical data learning DB, etc. In addition, the computer-readable recording medium may be distributed to network-connected computer devices, and computer-readable codes may be stored and executed in a distributed manner.

The drawings and the detailed description of the described disclosure referenced above are merely exemplary of the present disclosure, which are only used for the purpose of explaining the present disclosure, and are not used to limit the meaning or the scope of the present disclosure described in the claims. Therefore, they may be easily selected and replaced therefrom by a person of an ordinary skill in the art. In addition, a person of an ordinary skill in the art may omit some of the components described herein without degrading performance or add components to improve performance. Additionally, a person of an ordinary skill in the art may change the order of the method steps described herein according to the process environment or equipment. Accordingly, the scope of the present disclosure should be determined by the claims and their equivalents rather than the described embodiments.

DESCRIPTION OF SYMBOLS

1: vehicle
2: monitoring system
20: vision sensor

What is claimed is:

1. A seat belt apparatus of a vehicle, the seat belt apparatus comprising:
a seat belt coupled to a seat and comprising a webbing comprising a detectable material or a paint in at least one pattern;
a vision sensor configured to generate an image by capturing a field of view region comprising the seat; and
a monitoring system configured to:
detect the detectable material or the pattern coated with the at least one paint in the image;
detect a pattern matching a specific pattern in the image;
determine whether a user wears the seat belt correctly or erroneously wears the seat belt based on the detected detectable material or the pattern coated with the at least one paint;
derive at least two regions of interest (ROI) from the image; and
calculate a withdrawn webbing length by:
storing a pattern detected at an uppermost end of a non-wearing ROI among the derived at least two ROIs; and
comparing a number of the patterns detected at the uppermost end of a wearing ROI among the derived at least two ROIs with a number of the patterns detected at the uppermost end of the non-wearing ROI after the seat belt is worn;
wherein the uppermost end of the non-wearing ROI and the uppermost end of the wearing ROI are common predetermined areas.

2. The seat belt apparatus of claim 1, wherein the seat belt comprises a webbing that comprises the detectable material.

3. The seat belt apparatus of claim 2, wherein the webbing comprises the detectable material coated as a paint in at least one pattern.

4. The seat belt apparatus of claim 1, wherein the webbing comprises:
a webbing having a regular order with area and length information, and implemented in a paint coating pattern having an infrared reflectance equal to or greater than a predetermined range.

5. The seat belt apparatus of claim 4, wherein the paint coating pattern:
forms a webbing structure comprising an infrared paint coating pattern having a unique number of a certain size, and
determines an amount of webbing withdrawal by the paint coating pattern.

6. The seat belt apparatus of claim 4, wherein the paint coating pattern is implemented in post-painting or implemented in yarn pre-painting coating.

7. The seat belt apparatus of claim 1, wherein the monitoring system is configured to:
compare a predetermined reference webbing length range and the detected length of the withdrawn webbing, and
determine whether the user wears the seat belt correctly or erroneously wears the seat belt based on a comparison result.

8. The seat belt apparatus of claim 1, wherein the monitoring system is configured to:
detect a number of patterns detected in the wearing ROI among the derived at least two ROIs after the seat belt is worn.

9. The seat belt apparatus of claim 8, wherein the monitoring system is configured to:
determine that the user normally wears the seat belt when the withdrawn webbing length is within the reference webbing length range and the number of patterns detected in the wearing ROI is greater than or equal to the reference number range.

10. The seat belt apparatus of claim 9, wherein the monitoring system is configured to:
generate a re-capturing control command with respect to the vision sensor and transmit the re-capturing control command to the vision sensor when it is determined that the user erroneously wears the seat belt.

11. The seat belt apparatus of claim 10, wherein the vision sensor is configured to:
generate an image by re-capturing a field of view region according to the re-capturing control command, and
transmit the image generated through re-capturing to the monitoring system.

12. The seat belt apparatus of claim 11, wherein the monitoring system is configured to:
control a speaker or a display of the vehicle to perform a notification to warn the user to wear the seat belt before re-capturing when it is determined that the user erroneously wears the seat belt.

13. The seat belt apparatus of claim 1, wherein the monitoring system is configured to:
use image matching or a convolution neural network (CNN) algorithm in order to derive the pattern matching the specific pattern from the image.

14. The seat belt apparatus of claim 1, wherein the monitoring system is configured to:
select one of a plurality of patterns from a plurality of frames constituting the image,
track a displacement of the pattern selected at all times in each of the plurality of frames, and
estimate a respiration rate; and/or
the monitoring system is configured to:
track a displacement of each of an x-axis and a y-axis of the selected pattern,
count the number of times a length of each of the x-axis and the y-axis increases and decreases, and
estimate the respiration rate.

15. The seat belt apparatus of claim 1, wherein the detectable material comprises at least one pattern that comprises:
a pattern according to an n×n number system, wherein n is a natural number equal to or greater than 3; and/or the detectable material comprises at least one pattern that comprises:
a pattern with a rule according to at least one of a figure, a logo, a letter, and a number.

16. The seat belt apparatus of claim 1, wherein the detectable material comprises at least one pattern that comprises:
a pattern comprising a plurality of patterns with no rule in a specific order.

17. A vehicle comprising the seat belt apparatus of claim 1.

* * * * *